United States Patent [19]
Allen, Jr.

[11] 3,733,746
[45] May 22, 1973

[54] SELF FEEDING FLOWER POT

[76] Inventor: William G. Allen, Jr., 2329 Tuscora Rd., Bon Air, Va. 23235

[22] Filed: July 29, 1971

[21] Appl. No.: 167,175

[52] U.S. Cl. .................................... 47/38, 47/41
[51] Int. Cl. ............................................. A01g 27/00
[58] Field of Search ........................ 47/34, 38, 38.1, 47/41, 41.11; 111/7.1

[56] References Cited

UNITED STATES PATENTS

| 2,288,678 | 7/1942 | Blumentritt | 47/38 |
| 3,315,925 | 5/1967 | Pawl | 47/41 X |
| 3,534,498 | 10/1970 | Herrli | 47/38.1 |
| 3,192,665 | 7/1965 | Cloud | 47/38.1 |
| 3,552,058 | 1/1971 | Fici | 47/38 |
| 2,810,235 | 10/1957 | Magid | 47/38.1 |
| 3,058,263 | 10/1962 | Reynolds | 47/38.1 |
| 3,220,144 | 11/1965 | Green | 47/38.1 |
| 2,800,865 | 7/1957 | Gathercoal | 111/7.1 |
| 2,718,855 | 9/1955 | Gathercoal | 111/7.1 |

Primary Examiner—Robert E. Pulfrey
Assistant Examiner—E. M. Coven
Attorney—Kimmel, Crowell & Weaver

[57] ABSTRACT

A flower pot having an imperforate core that includes an annular inner wall that forms a tube in which a plant is received, an annular outer wall that in conjunction with the inner wall forms a reservoir for a nutrient solution and a top wall that extends between the inner and outer walls. The pot also has an imperforate jacket that includes a floor that extends below and across the bottom of the core and an annular wall that extends upwardly of the floor and is outwardly of and in close proximity to the outer wall of the core. A passage between the floor and the bottom of the inner wall enables the nutrient solution to flow from the reservoir to the bottom of the tube.

4 Claims, 5 Drawing Figures

PATENTED MAY 22 1973 3,733,746

INVENTOR
WILLIAM G. ALLEN JR.
BY
Kimmel, Crowell & Weaver
ATTORNEYS 3,733,746

SELF FEEDING FLOWER POT

BACKGROUND OF THE INVENTION

This invention is concerned with flower pots of the type that have nutrient solutions therein for feeding a plant located in the pot. Flower pots of this type, as exemplified by U. S. Pat. Nos. 2,288,678 and 2,519,166, have a tube for receiving a plant and a reservoir surrounding the tube in which a nutrient solution is stored and from which the nutrient solution passes to the bottom of the tube. These pots have proven to be relatively complex and cumbersome with regard to initially filling and then replenishing the reservoir with the solution. This problem is solved by this invention.

SUMMARY OF THE INVENTION

The flower pot of this invention includes a core having the tube and the reservoir therein and a jacket surrounding the core having a floor extending below the bottom of the core. A passage is located between the floor and the bottom of the tube to enable the nutrient solution to flow from the reservoir to the bottom of the tube. With this construction, in order to initially fill or replenish the reservoir with the nutrient solution, one fills the reservoir with the solution while the core is inverted and the jacket is removed from the core, then places the jacket on the core, and then moves the flower pot to an upright position.

DESCRIPTION OF THE PREFERRED EMBODIMENT

Figure 1:
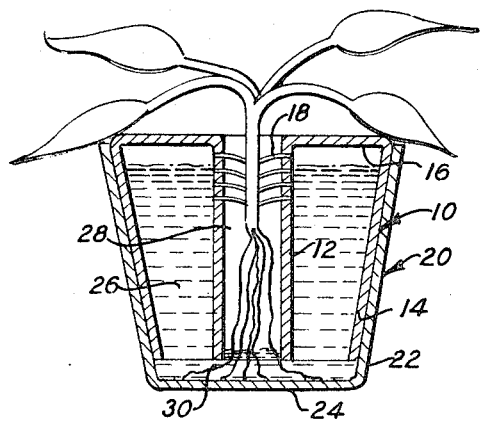
FIG. 1 is a vertical section of the flower pot in its upright position.

The flower pot comprises an imperforate core 10 having an annular inner wall 12, an annular outer wall 14 and a top wall 16 extending between the walls 12 and 14. Spring fingers 18 are secured to the wall 12 and extend inwardly thereof. An imperforate jacket 20 embraces, in a close fit, the core 10. The jacket comprises an annular wall 22 that extends about the wall 14 in close contact therewith and a floor 24 that extends below and across the bottom of the core 10 so that it is spaced from the bottom of the wall 12.

In the use of the flower pot, the reservoir 26 formed by the annular space between the core walls 12 and 14 is filled with a nutrient solution composed of water and nutrients, in the manner described below. The plant is inserted into the tube 28 formed by the core wall 12 and is held therein by the fingers 18. The roots of the plant extend to the bottom of the tube 28 where their bottoms are immersed in the solution that flows into the bottom of the tube 28 from the reservoir 26 through the passage 30 formed between the bottom of the wall 12 and the jacket floor 24. Since the only access to air of the reservoir 26 is through the passage 30, the solution rises only a short amount in the tube 28 so as to cover the plant roots, the level of the solution in the tube 28 being well below the level of the solution in the reservoir 26.

The plant is able to secure its nourishment from the bottom of the tube 28 but, because most of the root system is exposed to the moist air in the tube, the plant is not "drowned". As the plant withdraws solution from the bottom of the tube, the solution is replaced from the reservoir, maintaining a substantially constant level of solution in the bottom of the tube. Thus the plant does not require constant attention and, depending on the size of the plant, may be allowed to go unattended for periods up to several months. In addition, the constant amount of moisture received by the plant results in a healthier plant.

Figure 2:
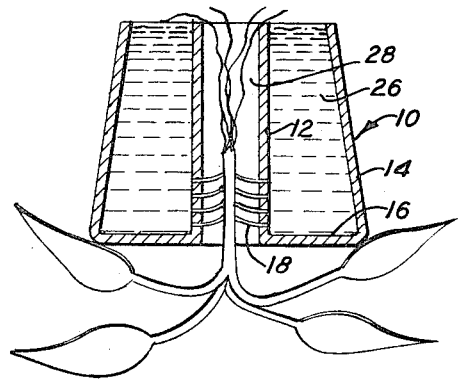
FIG. 2 is a vertical section of the core in its inverted position.
Figure 3:
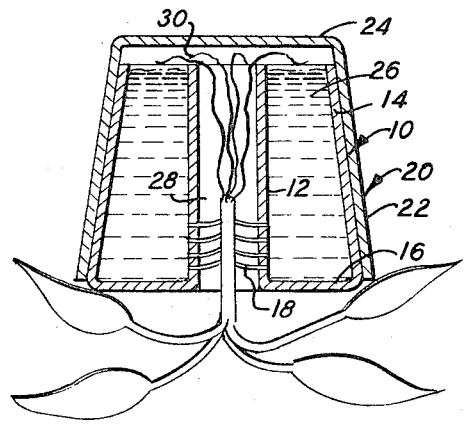
FIG. 3 is a vertical section of the flower pot in its inverted position.

When it is desired to start a plant growing in the flower pot, the plant is placed in the tube 28, making sure that the roots extend to the bottom of the tube, the plant being held centered in the tube by the fingers 18. The pot is then inverted and the jacket 20 is removed from the core 10 either before or after the inversion (see FIG. 2). The plant can also be inserted in the tube 28 after the inversion of the pot. The solution is then placed in the reservoir 26 while the core is inverted. This is followed by the placement of the jacket 20 on the core 10 (FIG. 3) and the return of the pot to the FIG. 1 upright position.

When it is desired to replenish the solution in the pot while a plant is growing in the pot, the pot is inverted, the jacket 20 is then lifted off the core 10, the reservoir 26 is then filled with the solution, the jacket 20 is then replaced on the core 10, and the pot is then returned to the upright position.

Figure 4:
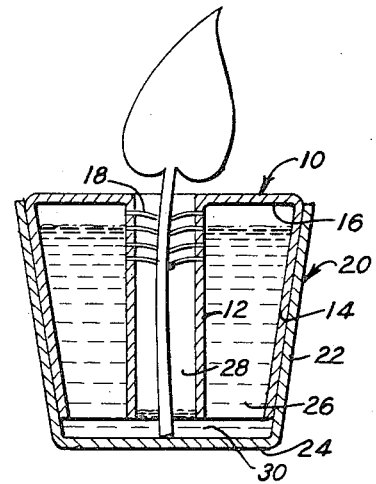
FIG. 4 is a vertical section of the flower pot showing a leaf that is to be rooted therein.
Figure 5:
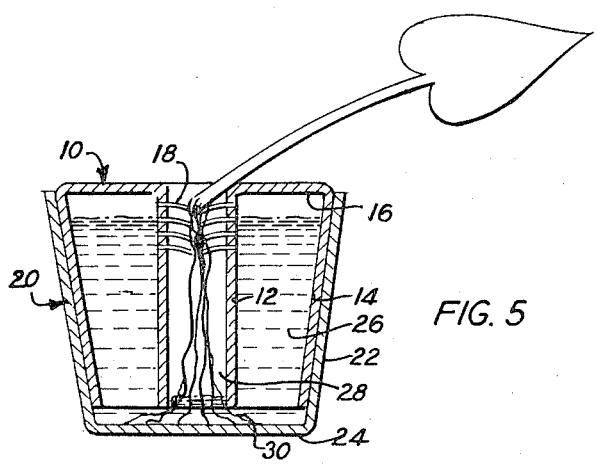
FIG. 5 is a vertical section of the flower pot showing the leaf after roots have been developed thereon.

The flower pot may also be used to produce rooted plants from cuttings. Referring to FIG. 4, an African violet leaf is shown placed in the pot and held therein by the fingers 18 with the bottom of the leaf immersed in the solution at the bottom of the tube 28. After several weeks, when roots have developed at the bottom of the leaf, the leaf is raised to the top of the tube 28 to produce a new plant (see FIG. 5).

The flower pot also has utility in growing bulbs indoors. The bulb is packaged in the tube 28 by the bulb packager. All the purchaser has to do to start the bulb growing is fill the core 10 with liquid while it is in the inverted FIG. 2 position, place the jacket 20 on the core and return the pot to its upright FIG. 1 position.

It is noted that, in order to facilitate removal of the jacket 20 from the core 10 and placement of the jacket in the core, the walls 14 and 22 slope upwardly and outwardly.

I claim:

1. A self-feeding flower pot comprising an imperforate core, said core having an annular inner wall with opposed upper and lower edges, an outer annular wall with opposed upper and lower edges, the inner face of said inner wall defining an opening for the reception of a plant, and a top wall extending between and connecting the respective upper edges of said inner and outer walls; an imperforate jacket in which said core is adapted to be releasably received, said jacket having a floor that is disposed beneath the lower edges of said inner and outer walls of said core, and an annular wall connected to and extending upwardly of said floor, said annular jacket wall being in frictional engagement with said core outer wall; said inner and outer walls and top of said core defining a receptacle which can be filled with water or plant nutrient solution when said core and said jacket are disassembled and said core is in an inverted position, after which said jacket can be engaged over said core and the assembled core and jacket reinverted; and passage means connecting said opening defined by said inner face of said inner wall of said core with said receptacle defined by said inner and outer walls and said top of said core when said core and said jacket are in assembled relation, whereby when the flower pot is in its normal use position the water or plant nutrient solution will flow, at a controlled rate, into said opening defined by said inner face of said inner wall of said core from said receptacle defined by said inner and outer walls and said top of said core.

2. A device as set forth in claim 1 and including inwardly extending gripping means formed on said inner face of said inner wall of said core for gripping the stem of a plant to be positioned in said flower pot so that the bottom of the plant will be properly positioned with respect to the plant nutrient solution.

3. The flower pot as defined in claim 1 wherein said lower edge of said inner wall of said core is spaced from said floor of said jacket to thereby form said passage means.

4. The flower pot as defined in claim 1 wherein said outer wall of said core and said jacket wall slope upwardly and outwardly.

* * * * *